United States Patent [19]

Huang

[11] Patent Number: 5,732,093
[45] Date of Patent: Mar. 24, 1998

[54] ERROR CORRECTION METHOD AND APPARATUS ON OPTICAL DISC SYSTEM

[75] Inventor: Wei-Hung Huang, Miaoli Hsien, Taiwan

[73] Assignee: United Microelectronics Corporation, Taiwan

[21] Appl. No.: 598,421

[22] Filed: Feb. 8, 1996

[51] Int. Cl.$^6$ ................................... G11B 20/18
[52] U.S. Cl. ........................... 371/40.3; 371/40.14
[58] Field of Search .................. 371/37.5, 40.3, 371/40.14

[56] References Cited

U.S. PATENT DOCUMENTS

| | | | |
|---|---|---|---|
| 4,413,340 | 11/1983 | Odaka et al. | 371/38.1 |
| 4,677,622 | 6/1987 | Okamoto et al. | 371/37.5 |
| 5,060,221 | 10/1991 | Sako et al. | 369/59 |

*Primary Examiner*—Stephen M. Baker
*Attorney, Agent, or Firm*—Rabin, Champagne, & Lynt, P.C.

[57] ABSTRACT

An error correction method and apparatus for optical disc systems, capable of performing error correction procedures selectively according to the type of optical disc being used, such as CD-DA and CD-ROM, either of which can be used interchangeably in the system. In the method, the first step is to receive old data sequences and old erasure pointers associated with the old data sequences from the optical disc drive. The second step is to decode the old data sequences and the associated erasure pointers so as to generate new data sequences and a set of erasure pointer modification parameters. In the final step, a number of erasure pointers to be associated with the new data sequences are determined based on the set of erasure pointer modification parameters, and by using a first transform method if a first type of optical disc such as CD-DA is being read and a second transform method if a second type of optical disc such as CD-ROM is being read. In the apparatus, a decoding circuit is used to perform the aforementioned first step; a logic mapping transform circuit is coupled to the decoding circuit and used for performing the aforementioned second step. Moreover, a multiplexer is used to select the output of the logic mapping transform circuit or the old erasure pointers as output of the apparatus.

16 Claims, 2 Drawing Sheets

5,732,093

ERROR CORRECTION METHOD AND APPARATUS ON OPTICAL DISC SYSTEM

BACKGROUND OF THE INVENTION

1. Field of the Invention

The invention relates to optical disc systems, and more particularly, to an error correction method and apparatus for use on optical disc systems to correct erroneous data produced during data transfer or storage. Characteristically, the error correction method and apparatus according to the invention is capable of performing a first error correction procedure if a first type of optical disc such as CD-DA is being read, and a second error correction procedure if a second type of optical disc such as CD-ROM is being read.

2. Description of Prior Art

An optical disc is a high-capacity data storage medium capable of storing great mounts of digital data such as computer software, images, video, and sound. An optical disc is a small plastic disc and is readable by optical means such as a laser. The optical disc is highly portable, durable, and reliable, which make it the most widely used data storage medium. Due to its small size, the optical disc is commonly referred to as a "compact disc", or CD.

There are various types of CDs that differ depending on the nature of the data stored thereon, including, for example, CD-ROM (compact disc read-only memory) which stores computer software and data, CD-DA (compact disc digital audio) which stores sound data (particularly music pieces), Video CD which stores video data, and CD-I (compact disc interactive) which stores interactive multimedia data including audio, video, image, and text. Most optical disc systems now on the market are provided with the capability to read data of various formats from different types of CDs. For instance, the CD-ROM drive on a PC system is usually not only able to read computer data from CD-ROMs but also able to play music from CD-DAs.

U.S. Pat. No. 4,413,340 discloses a method for error correction of data on optical disc systems capable of reading data both from CD-ROMs and CD-DAs. When data is read out from an optical disc, whether a CD-ROM or a CD-DA, the data is first and foremost decoded through eight-to-fourteen modulation (EFM) into a stream of byte-based data. Then, the byte-based data is processed in succession by two Reed Solomon (RS) decoders for correction of erroneous bits in the data stream.

It is a drawback of the aforementioned prior art method that the same error correction steps are applied to the received data regardless of whether the data is from a CD-ROM or a CD-DA. Since these two types of CDs store data of differing nature, the error correction steps involved in this prior art method could be inadequate, as will be described in more detail in the following with reference to FIG. 1.

Referring to FIG. 1, there is shown a schematic block diagram of an apparatus according to the prior art, which is composed of a first deinterleaver 110, a first decoder 120, a second deinterleaver 130, a second decoder 140, a third deinterleaver 150, a CD-ROM/CD-DA selector 160, a digital-to-analog converter 170 coupled to a speaker, and a third decoder 180 coupled through an interface to a computer (CPU, not shown). Data read out from the optical disc is first and foremost transformed through the EFM process into a stream of byte-based data. The first deinterleaver 110 receives and deinterleaves the byte-based data and then sends the deinterleaved data to the first decoder 120 for a first round of error correction. Subsequently, the data is deinterleaved by the second deinterleaver 130 and then processed by the second decoder 140 for a second round of error correction. Then, the output data from the second decoder 140 is deinterleaved by the third deinterleaver 150 before being sent to the CD-ROM/CD-DA selector 160.

The CD-ROM/CD-DA selector 160 is a routing circuit which routes the output of the third deinterleaver 150 to the digital-to-analog converter 170 if the current optical disc being read is CD-DA and to the third decoder C3 180 if the current optical disc being read is CD-ROM. The digital-to-analog converter 170 will convert the CD-DA data to an analog signal for audio reproduction by the speaker, and the third decoder C3 180 will further process the CD-ROM data received for third round of error correction and then send the output via the interface to the computer.

To allow the decoders 120, 140, and 180 to adequately perform the error correction, the byte-based data is associated with an erasure pointer which indicates whether the associated data is correct or not. U.S. Pat. No. 4,677,622 discloses a 3-bit erasure pointer that allows more reliable decoding and error correction of the data.

In the case of CD-DA, when the digital-to-analog converter 170 receives erroneous data, the sound reproduced by the speaker could be noise instead of melody. Even worse, the sound could contain spikes that could cause damage to the speaker. The provision of the erasure pointer is a solution to this problem. When the erasure pointer of a data byte is TRUE, it indicates that the data byte contains one or more erroneous bits. In this case, the data byte is discarded and the preceding data byte and the subsequent one are averaged to provide a substitute for the discarded incorrect data byte. To protect the audio system and provide high quality CD-DA music, the erasure pointer should be strictly set such that all incorrect data bytes can be erased.

In the case of CD-ROM, it is required that the data transferred to the computer be absolutely correct. Therefore, in the data transfer route to the computer there should be provided as many decoders as possible for near 100% reliable decoding of the data. In the illustrated embodiment, three decoders 120, 140, and 180 are provided for such a purpose. Through the three decoders 120, 140, and 180, the decoded data can be nearly 100% correct. Accordingly, the erasure pointer can be less strictly set. In other words, as long as a data byte is considered correctable, its erasure pointer can be set to FALSE instead of TRUE in the earlier stages (i.e., in the first decoder 120 and second decoder 140). The data not corrected by these two decoders 120, 140 can nonetheless be corrected by the third decoder 180.

Considering the difference in the requirements for decoding CD-DA data and those for decoding CD-ROM data, different procedures should be used in the two cases to set the erasure pointers. However, in all of the prior art methods the same procedure is used to set the erasure pointers. If the erasure pointers are strictly set because the designer wants to assure high-quality reproduction of CD-DA music, such that the sound of music contains no noise and no spikes, the speed of decoding of CD-ROM data would be affected because correct data bytes could have their erasure pointers set to TRUE and this would make the optical system reread data from the optical disc.

SUMMARY OF THE INVENTION

It is therefore a primary objective of the invention to provide an optical disc data error correction method and apparatus which is capable of performing error correction procedures selectively according to the type of optical disc being read, particularly where the type of optical disc is interchangeable between CD-DA and CD-ROM.

In accordance with the foregoing and other objectives of the invention, there is provided a new and improved method and apparatus for error correction of optical disc data. The method comprises the steps of: (1) producing a number of old data sequences and corresponding number of erasure pointers associated with the old data sequences; (2) decoding the old data sequences and the associated erasure pointers so as to generate a number of new data sequences and a set of erasure pointer modification parameters; and (3) based on the set of erasure pointer modification parameters, determining a number of erasure pointers to be associated with the new data sequences by using a first transform method if a first type of optical disc is being read and by using a second transform method if a second type of optical disc is being read.

The apparatus for performing the foregoing method comprises: (a) a decoding circuit that receives a number of old data sequences and a corresponding number of old erasure pointers associated with the old data sequences, for decoding the old data sequences and the associated old erasure pointers so as to generate a number of new data sequences and a set of erasure pointer modification parameters; (b) a logic mapping transform circuit, coupled to the decoding circuit, for generating a number of erasure pointers to be associated with the new data sequences which are determined based on the set of erasure pointer modification parameters, further based on a logic mapping transform table generated according to a first transform method if a first type of optical disc is being read, and further based on a logic mapping transform table generated according to a second transform method if a second type of optical disc is being read; and (c) multiplexer means, coupled to the logic mapping transform circuit and the old erasure pointers, for selectively outputting from the apparatus the erasure pointers generated by said logic mapping transform circuit or the old erasure pointers.

BRIEF DESCRIPTION OF DRAWINGS

The invention can be more fully understood by reading the subsequent detailed description of the preferred embodiment thereof with reference to the accompanying drawings, wherein.

DETAILED DESCRIPTION OF PREFERRED EMBODIMENT

Figure 1:
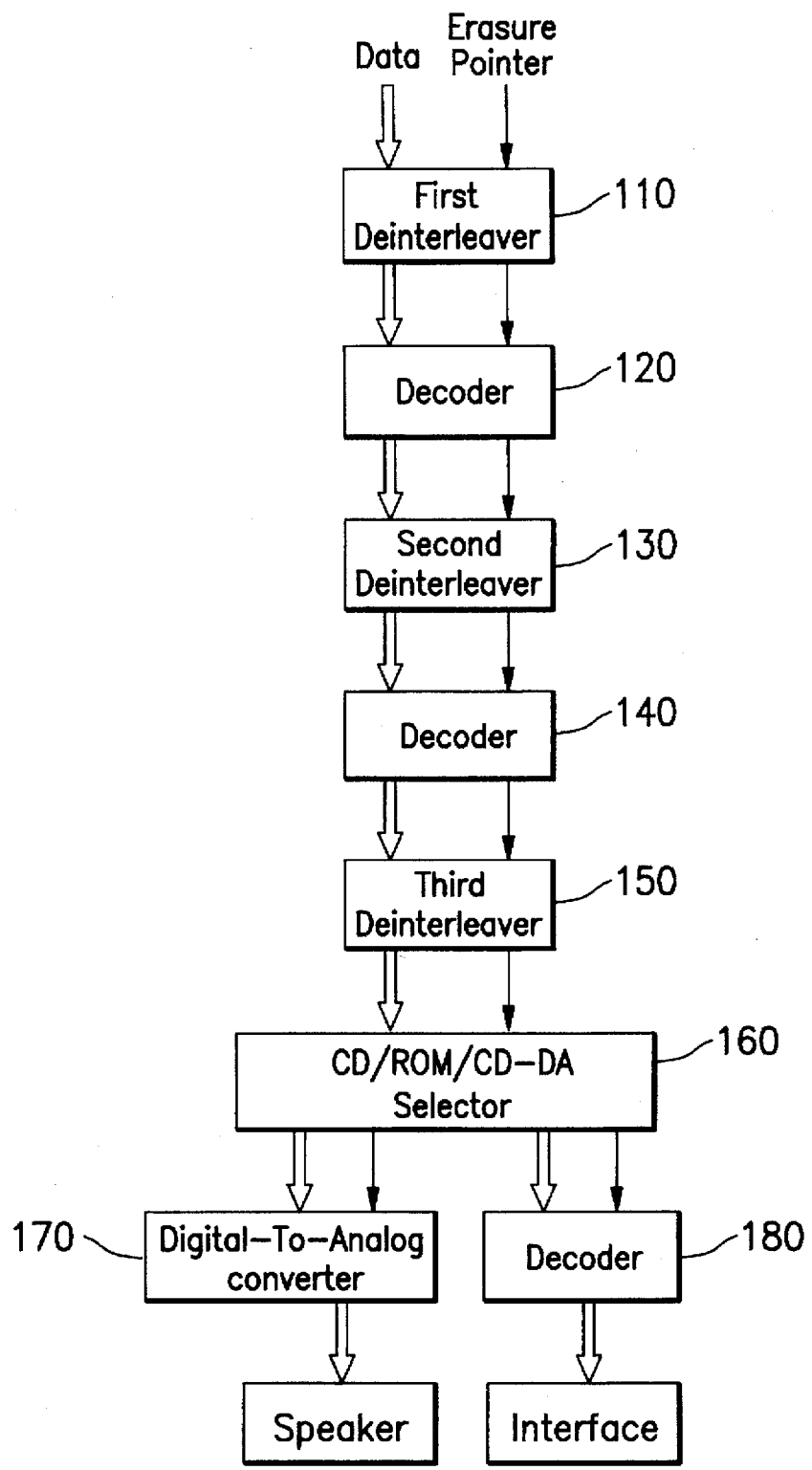
FIG. 1 is a block diagram showing a prior art apparatus for decoding and error correction of data on an optical disc system.
Figure 2:
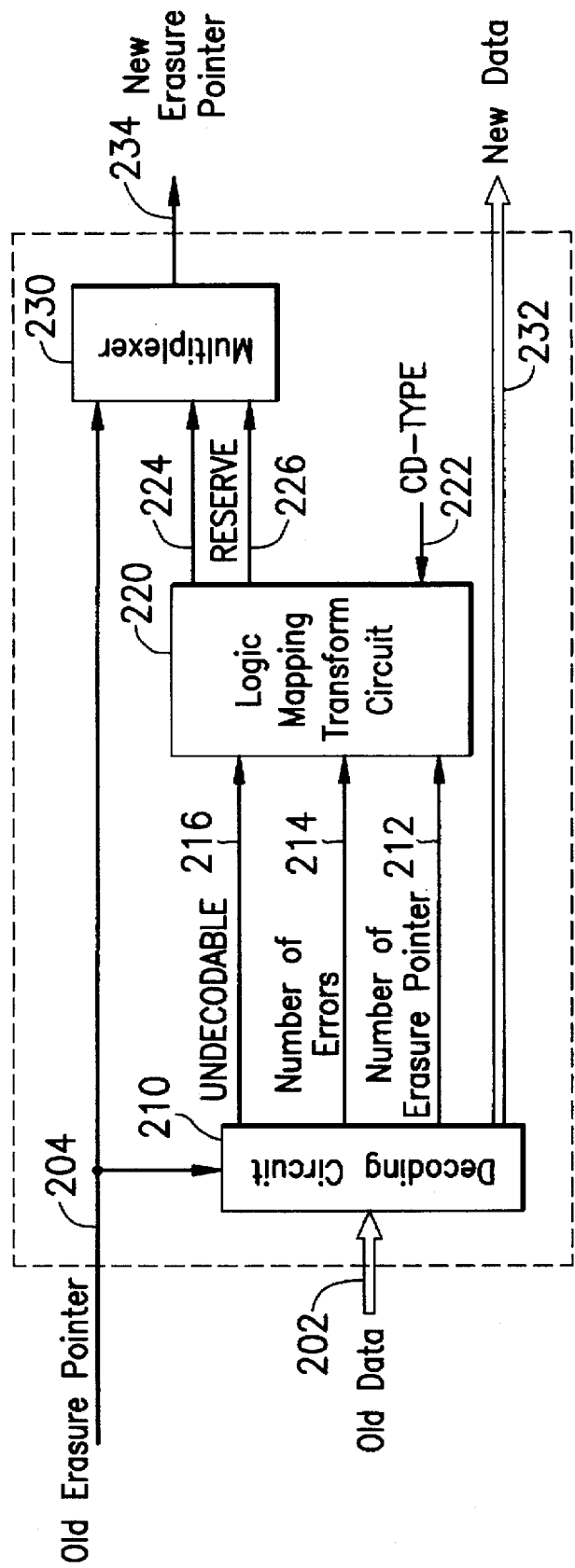
FIG. 2 is a block diagram showing an apparatus according to the invention for decoding and error correction of data on an optical disc system.

The invention provides an improvement to the first decoder 120 and the second decoder 140 in the prior art apparatus of FIG. 1. The improved decoder, as shown in FIG. 2, is capable of performing error correction procedures selectively according to the particular type of optical disc being read, which is either CD-DA or CD-ROM in the preferred embodiment disclosed herein, so as to set values to erasure pointers in differing manners. In the apparatus of FIG. 1, the two decoders 120, 140 are RS decoders, but it is to be understood that the invention is not limited to the use of RS decoders and can be adapted for use of other types of decoders.

Referring to FIG. 2, the decoder according to the invention includes a decoding circuit 210, a logic mapping transform circuit 220, and a multiplexer 230. The decoder according to the invention receives a number of data sequences and a corresponding number of erasure pointers associated with the data sequences from the optical disc drive (such data and erasure pointers are hereinafter referred to as "old data" and "old erasure pointers" respectively, as depicted in the drawing) and decodes them into new forms of data (the outputs thereof are hereinafter referred to as "new data" and "new erasure pointers" respectively, as depicted in the drawing).

The decoding circuit 210 takes in old data 202 and old erasure pointers 204. It is an important aspect of the invention that, besides the conventional function of decoding the old data 202 into new data 232, the decoding circuit 210 is devised to generate three erasure pointer modification parameters including (1) a first parameter 212 denoting the total number of old erasure pointers that are TRUE, (2) a second parameter 214 denoting the total number of errors in the old data, and (3) a third parameter 216 used to indicate whether the current data byte is decodable or undecodable.

Subsequently, the logic mapping transform circuit 220 takes in the three parameters 212, 214, 216 and a CD-TYPE signal 222 indicating the type of optical disc being read from the disc drive. The outputs of circuit 220 are new erasure pointers 224 and a RESERVE control signal 226. In the logic mapping transform circuit 220, if the CD-TYPE signal indicates that a first type of optical disc, for instance a CD-DA, is being read, a first procedure is used to determine the values of the new erasure pointers 224, while if a second type of optical disc, for instance, a CD-ROM, is being read, a second procedure is used to determine the values of the new erasure pointers 224.

The first procedure for CD-DA utilizes a first transform method including the use of a first logic mapping transform table as given in Table 1 to set new values for the erasure pointers associated with the new data, while the second procedure for CD-ROM utilizes a second transform method including the use of a second logic mapping transform table as given in Table 2.

TABLE 1

Logic Mapping Transform Table for Error Correction of CD-DA Data

| Number of errors | Number of erasure pointers | | | | | |
|---|---|---|---|---|---|---|
| | 0 | 1 | 2 | 3 | 4 | >4 |
| 0 | 0 | 0 | 0 | 0 | 0 | 0 |
| 1 | 0 | 0 | 0 | 0 | 0 | 0 |
| 2 | 1 | 0 | 0 | 0 | 0 | 1 |
| 3 | X | X | 1 | 0 | 0 | X |
| 4 | X | X | X | X | 1 | X |
| Undecodeable | 1 | 1 | 1 | 1 | 1 | RESERVE |

X: indicates nonexistent condition
RESERVE: indicates that the new erasure pointer is to retain the value of the old one.

TABLE 2

Logic Mapping Transform Table for Error Correction of CD-ROM Data

| Number of errors | Number of erasure pointers | | | | | |
|---|---|---|---|---|---|---|
| | 0 | 1 | 2 | 3 | 4 | >4 |
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | X | X | 0 | 0 | 0 | X |
| 4 | X | X | X | X | 0 | X |
| UNDECODABLE | 1 | 1 | 1 | 1 | 1 | RESERVE |

X: indicates nonexistent condition
RESERVE: indicates that the new erasure pointer is to retain the value of the old one.

In each of the foregoing lookup tables, the arguments in the top-most row are the number of erasure pointers (the first parameter 212) while the arguments in the left-most column are the number of errors in the old data (the second parameter 214). If the number of errors exceeds 4, the old data is undecodable (the third parameter 216). The value 1 in the tables represents TRUE for the new erasure pointer 224 and the value 0 represents FALSE for the new erasure pointer 224.

The logic mapping transform circuit 220 uses these two tables to find corresponding values for the new erasure pointers. For example, in the case of CD-DA, if the decoding circuit 210 determines that the number of erasure pointers in the old data is 2 and the number of errors is 3, then from a lookup in Table 1, it can be found that the corresponding value is 1, and therefore this value is used for the new erasure pointer 224. If the number of erasure pointers and that of the errors both exceed 4, the RESERVE signal 226 is true, which lets the new erasure pointer be equal to the old one.

The outputs of the logic mapping transform circuit 220 and the old erasure pointer are coupled to the multiplexer 230. The RESERVE signal 226 serves as selection control to the multiplexer 230, i.e., if the RESERVE signal is true, the multiplexer 230 selects the old erasure pointer 204 as its output 234; otherwise, the multiplexer 230 selects the output 224 of the logic mapping transform circuit 220 as its output 234. In this embodiment, the decoding circuit 210 can be an RS decoder without modifications to the core architecture. The invention thus provides an effective, while economic, way of performing error correction on optical disc systems.

In accordance with the foregoing, the error correction method of the invention includes the following steps. In the first step, a number of data sequences and a corresponding number of erasure pointers associated with the data sequences (referred to "old data" and "old erasure pointer" respectively) are received from the optical disc drive. Next, the old data sequences and the associated erasure pointers are decoded so as to generate a number of new data sequences and a set of erasure pointer modification parameters. The erasure pointer modification parameter set includes: a first parameter denoting the total number of old erasure pointers that are TRUE; a second parameter denoting the total number of errors in the old data; and a third parameter used to indicate whether the current data byte is decodable or undecodable. Finally, based on the set of erasure pointer modification parameters, a number of erasure pointers to be associated with the new data sequences are determined by using a first transform method if a first type of optical disc such as CD-DA is being read and by using a second transform method if a second type of optical disc such as CD-ROM is being read.

Assume that the number of errors in the old data with erasure pointers is t and the number of errors in the old data without erasure pointers is d, then in the case of CD-DA the first logic mapping transform table can be generalized by the following algorithm:

if $t+2d \leq 3$, then NEWERASUREPOINTER=0; and if $t \geq 4$ and UNDECODABLE is true,
  then NEWERASUREPOINTER=OLDERASURE POINTER;

otherwise, NEWERASUREPOINTER=1.

In the case of CD-ROM, the second logic mapping transform table can be generalized by the following algorithm:

if UNDECODABLE is false, then NEWERASURE POINTER=0; and if $t \geq 4$ and UNDECODABLE is true,
  then NEWERASUREPOINTER=OLDERASURE POINTER;

otherwise, NEWERASUREPOINTER=1.

With the provision of the first transform method and the second transform method, selection between them being made according to the type of optical disc being read, the error correction capability of the apparatus according to the invention can be optimized.

The invention has been described above with an exemplary preferred embodiment. However, it is to be understood that the scope of the invention need not be limited to the disclosed preferred embodiment. To the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for error correction of data on an optical system, the optical system being able to read a plurality of types of optical discs including a first type and a second type, the method comprising:

(1) producing a number of old data sequences and corresponding number of old erasure pointers associated with the old data sequences from read data read from one of the plurality of types of optical discs;

(2) decoding the old data sequences and the associated old erasure pointers so as to generate a number of new data sequences and a set of erasure pointer modification parameters; and (3) based on the set of erasure pointer modification parameters, determining a number of new erasure pointers to be associated with the new data sequences by using a first transform method if the read data is from the first type of optical disc and a second transform method if the read data is from the second type of optical disc.

2. A method as claimed in claim 1, wherein the set of erasure pointer modification parameters includes:

a first parameter denoting the total number of old erasure pointers that are TRUE;

a second parameter denoting the total number of errors in the old data; and a third parameter indicating whether the current data byte is decodable or undecodable.

3. A method as claimed in claim 2, wherein the first type of optical disc is CD-DA and the second type of optical disc is CD-ROM.

4. A method as claimed in claim 3, wherein the second parameter includes information indicating the number of errors in the old data without erasure pointers.

5. A method as claimed in claim 1, wherein the first transform method is generalized by the following algorithm:
if t+2d≦3, then NEWERASUREPOINTER=0; and
if t≧4 and UNDECODABLE is true,
    then NEWERASUREPOINTER=OLDERASURE POINTER;
otherwise, NEWERASUREPOINTER=1;
and the second transform method is generalized by the following algorithm:
if UNDECODABLE is false, then NEWERASURE POINTER=0; and
if t≧4 and UNDECODABLE is true,
    then NEWERASUREPOINTER=OLDERASURE POINTER;
otherwise, NEWERASUREPOINTER=1;
wherein
t is the number of errors in the old data with erasure pointers;
d is the number of errors in the old data that have no erasure pointers;
UNDECODABLE is the third parameter, which is true if current data sequence is undecodable and false if decodable;
NEWERASUREPOINTER is the new erasure pointer; and
OLDERASUREPOINTER is the old erasure pointer.

6. A method as claimed in claim 1, wherein the first transform method utilizes a first map given in the following table:

| Number of errors | Number of erasure pointers | | | | | |
|---|---|---|---|---|---|---|
|  | 0 | 1 | 2 | 3 | 4 | >4 |
| 0 | 0 | 0 | 0 | 0 | 0 | 0 |
| 1 | 0 | 0 | 0 | 0 | 0 | 0 |
| 2 | 1 | 0 | 0 | 0 | 0 | 1 |
| 3 | X | X | 1 | 0 | 0 | X |
| 4 | X | X | X | 1 | 1 | X |
| UNDECODABLE | 1 | 1 | 1 | 1 | 1 | RESERVE | and the second transform method utilizes a second map given in the following table:

| Number of errors | Number of erasure pointers | | | | | |
|---|---|---|---|---|---|---|
|  | 0 | 1 | 2 | 3 | 4 | >4 |
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | X | X | 0 | 0 | 0 | X |
| 4 | X | X | X | X | 0 | X |
| UNDECODABLE | 1 | 1 | 1 | 1 | 1 | RESERVE | wherein
X indicates nonexistent condition;
RESERVE is a signal which if true indicates that the new erasure pointer retains the value of the old one; and
UNDECODABLE is the third parameter, which is true if current data sequence is undecodable and false if decodable.

7. An apparatus for error correction of data on an optical system, the optical system being able to read a plurality of types of optical discs including a first type and a second type, the apparatus comprising:
(a) a decoding circuit, receiving a number of old data sequences read from the optical disc and a corresponding number of old erasure pointers associated with the old data sequences, for decoding the old data sequences and the associated old erasure pointers so as to generate a number of new data sequences and a set of erasure pointer modification parameters;
(b) a logic mapping transform circuit, coupled to said decoding circuit, for generating a number of new erasure pointers to be associated with the new data sequences, said logic mapping transform circuit including means for determining the new erasure pointers based on the set of erasure pointer modification parameters, further based on a logic mapping transform table generated according to a first transform method if the first type of optical disc is being read, and further based on a logic mapping transform table generated according to a second transform method if the second type of optical disc is being read; and
(c) multiplexer means, coupled to said logic mapping transform circuit and the old erasure pointers, for selectively outputting from the apparatus the new erasure pointers generated by said logic mapping transform circuit or the old erasure pointers.

8. An apparatus as claimed in claim 7, wherein the set of erasure pointer modification parameters generated by said decoding circuit includes:
a first parameter denoting the total number of old erasure pointers that are TRUE;
a second parameter denoting the total number of errors in the old data; and
a third parameter indicating whether a current data byte is decodable or undecodable.

9. An apparatus as claimed in claim 8, wherein the first type of optical disc is CD-DA and the second type of optical disc is CD-ROM.

10. An apparatus as claimed in claim 9, wherein said decoding circuit is a Reed Solomon decoder.

11. An apparatus for error correction of data on an optical system, the optical system being able to read a plurality of types of optical discs, the apparatus comprising:
(a) means, responsive to a number of old data sequences read from the optical disc and a corresponding number of old erasure pointers associated with the old data sequences, for decoding the old data sequences and the associated old erasure pointers so as to generate a number of new data sequences and a set of erasure pointer modification parameters;
(b) means, coupled to said decoding means, and responsive to the set of erasure pointer modification parameters, and a signal indicative of the type of optical disc being read, for generating a number of new erasure pointers to be associated with the new data sequences; and
(c) multiplexer means, coupled to said new erasure pointers generating means and the old erasure pointers, for selectively outputting from the apparatus the new erasure pointers generated by said new erasure pointers generating means or the old erasure pointers.

12. An apparatus as claimed in claim 11, wherein the optical system is able to read first and second types of optical discs, and wherein said new erasure pointers generating means includes a logic mapping transform circuit having means for producing a first logic mapping transform table according to a first transform method and producing a logic mapping transform table according to a second transform method and generating the new erasure pointers based on the first logic mapping transform table if the second type of optical disc is being read and generating the new erasure pointers based on the second logic mapping transform table if the first type of optical disc is being read.

13. An apparatus as claimed in claim 12, wherein the set of erasure pointer modification parameters generated by said decoding means includes:

a first parameter denoting the total number of old erasure pointers that are TRUE;

a second parameter denoting the total number of errors in the old data; and a third parameter indicating whether a current data byte is decodable or undecodable.

14. An apparatus as claimed in claim 11, wherein the set of erasure pointer modification parameters generated by said decoding means includes:

a first parameter denoting the total number of old erasure pointers that are TRUE;

a second parameter denoting the total number of errors in the old data; and a third parameter indicating whether a current data byte is decodable or undecodable.

15. An apparatus as claimed in claim 14, wherein the first type of optical disc is CD-DA and the second type of optical disc is CD-ROM.

16. An apparatus as claimed in claim 15, wherein said decoding means is a Reed Solomon decoder.

* * * * *